(12) United States Patent
Ahmed et al.

(10) Patent No.: US 11,540,204 B1
(45) Date of Patent: Dec. 27, 2022

(54) ENFORCING FAIRNESS IN AIRTIME UTILIZATION AMONG DEVICES INCLUDING ARTIFICIAL REALITY DEVICES

(71) Applicant: Meta Platforms Technologies, LLC, Menlo Park, CA (US)

(72) Inventors: Nabeel Ahmed, San Jose, CA (US); Sam Padinjaremannil Alex, Dublin, CA (US); William Louis Abbott, Portola Valley, CA (US); Fabrizio Guerrieri, Santa Clara, CA (US); Payam Torab Jahromi, Laguna Niguel, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 66 days.

(21) Appl. No.: 16/941,213

(22) Filed: Jul. 28, 2020

Related U.S. Application Data

(60) Provisional application No. 62/926,796, filed on Oct. 28, 2019.

(51) Int. Cl.
*H04W 88/06* (2009.01)
*H04W 48/06* (2009.01)
*H04W 24/08* (2009.01)
*G06T 19/00* (2011.01)

(52) U.S. Cl.
CPC .......... *H04W 48/06* (2013.01); *H04W 24/08* (2013.01); *G06T 19/006* (2013.01)

(58) Field of Classification Search
CPC ...... H04W 48/06; H04W 24/08; G06T 19/006
See application file for complete search history.

(56) References Cited

U.S. PATENT DOCUMENTS

| 5,867,483 | A | * | 2/1999 | Ennis, Jr ................ H04L 41/22 370/252 |
| 7,801,104 | B2 | | 9/2010 | Gaur |
| 2014/0321423 | A1 | | 10/2014 | Kalhan |
| 2016/0345318 | A1 | | 11/2016 | Bhandaru et al. |
| 2017/0041929 | A1 | | 2/2017 | Noh et al. |
| 2018/0270175 | A1 | | 9/2018 | Kim et al. |

(Continued)

FOREIGN PATENT DOCUMENTS

WO 2019143189 A1 7/2019

*Primary Examiner* — Jamal Javaid
(74) *Attorney, Agent, or Firm* — Foley & Lardner LLP

(57) ABSTRACT

Disclosed herein are related to a system and a method of enforcing fairness in airtime utilization among devices including artificial reality devices. In one approach, a system as a first device may be configured to monitor, via the wireless communication interface, a wireless channel. The processor may be configured to determine information about other devices using the wireless channel. The processor may be configured to determine a target share of the wireless channel for use by the first device in communicating data for the artificial reality, according to the information about the other devices using the wireless channel. The processor may be configured to access, via the wireless communication interface, the wireless channel according to (1) the target share of the wireless channel and (2) a combined level of usage of the wireless channel by the first device and the other devices.

20 Claims, 8 Drawing Sheets

(56) References Cited

U.S. PATENT DOCUMENTS

| | | |
|---|---|---|
| 2019/0191376 A1 | 6/2019 | Kim et al. |
| 2019/0363843 A1 | 11/2019 | Gordaychik |
| 2020/0100197 A1* | 3/2020 | Pan .................. H04W 72/0466 |
| 2021/0076251 A1 | 3/2021 | Ho et al. |
| 2021/0120507 A1 | 4/2021 | De La Cruz et al. |

* cited by examiner

US 11,540,204 B1

ENFORCING FAIRNESS IN AIRTIME UTILIZATION AMONG DEVICES INCLUDING ARTIFICIAL REALITY DEVICES

CROSS-REFERENCE TO RELATED APPLICATION

This application claims priority to U.S. Provisional Patent Application No. 62/926,796, filed Oct. 28, 2019, which is incorporated by reference in its entirety for all purposes.

FIELD OF DISCLOSURE

The present disclosure is generally related to communication for rendering artificial reality, including but not limited to enforcing fairness in airtime utilization among devices including artificial reality devices while satisfying low latency.

BACKGROUND

Artificial reality such as a virtual reality (VR), an augmented reality (AR), or a mixed reality (MR) provides immersive experience to a user. In one example, a user wearing a head wearable display (HWD) can turn the user's head, and an image of a virtual object corresponding to a location of the HWD and a gaze direction of the user can be displayed on the HWD to allow the user to feel as if the user is moving within a space of artificial reality (e.g., a VR space, an AR space, or a MR space).

In one implementation, an image of a virtual object is generated by a console communicatively coupled to the HWD. In one example, the HWD includes various sensors that detect a location and/or orientation of the HWD, and transmits the detected location and/or orientation of the HWD to the console through a wired connection or a wireless connection. The console can determine a user's view of the space of the artificial reality according to the detected location and/or orientation of the HWD, and generate image data indicating an image of the space of the artificial reality corresponding to the user's view. The console can transmit the image data to the HWD, by which the image of the space of the artificial reality corresponding to the user's view can be presented to the user. In one aspect, the process of detecting the location of the HWD and the gaze direction of the user wearing the HWD, and rendering the image to the user should be performed within a frame time (e.g., less than 11 ms). Any latency between a movement of the user wearing the HWD and an image displayed corresponding to the user movement can cause judder, which may result in motion sickness and can degrade the user experience.

SUMMARY

Various embodiments disclosed herein are related to a method of enforcing fairness in airtime utilization among devices including artificial reality devices. In some implementations, the method may include monitoring, by a first device configured to execute an application for artificial reality, a wireless channel. The method may include determining, by the first device responsive to the monitoring, information about other devices using the wireless channel. The method may include determining, by the first device, a target share of the wireless channel for use by the first device in communicating data for the artificial reality, according to the information about the other devices using the wireless channel. The method may include accessing, by the first device, the wireless channel according to (1) the target share of the wireless channel and (2) a combined level of usage of the wireless channel by the first device and the other devices.

In some implementations, the method may include monitoring, by the first device, the combined level of usage of the wireless channel by the first device and the other devices, and comparing, by the first device, the combined level of usage with a utilization threshold. In some implementations, accessing the wireless channel may include determining, by the first device, that the combined level of usage is within the utilization threshold when a level of usage of the first device is near or at the target share, and accessing, by the first device, the wireless channel beyond the target share responsive to the determining that the combined level of usage is within the utilization threshold when the level of usage of the first device is near or at the target share.

In some implementations, determining the target share may include determining a range for the target share according to the information about the other devices, and determining the target share in the range. Accessing the wireless channel may include determining, by the first device, that the combined level of usage is near or approaching the utilization threshold. Accessing the wireless channel may further include responsive to the determining that the combined level of usage is near or approaching the utilization threshold, reducing, by the first device, the first device's access to wireless channel from the target share to a new target share that is greater than or equal to a minimum value of the range.

In some implementations, monitoring the wireless channel may include monitoring the wireless channel using at least one of energy detection, inspection of a management frame, or sniffing wireless frames. In some implementations, determining the information about the other devices may include at least one of (1) determining a number of the other devices and the first device using the wireless channel, (2) determining a number of beacons transmitted in the wireless channel, (3) determining a number of distinct media access control (MAC) addresses of the other devices and the first device that are using the wireless channel, or (4) determining a number of distinct traffic classes over the other devices and the first device that are using the wireless channel.

In some implementations, accessing the wireless channel may include determining that data is available from the first device for communication via the wireless channel. Accessing the wireless channel may further include accessing, by the first device within a defined time from the data being available, the wireless channel according to the target share and the combined level of usage of the wireless channel.

In some implementations, accessing the wireless channel may include accessing the target share of the wireless channel according to one or more time slots. The other devices may access the wireless channel using their respective time slots.

In some implementations, accessing the target share of the wireless channel may include determining, by the first device, that a second device of the other devices is not using a time slot allocated to the second device. Accessing the target share of the wireless channel may further include accessing, by the first device, the wireless channel using the time slot allocated to the second device, responsive to determining that the second device is not using the time slot allocated to the second device. In some implementations, accessing the wireless channel may include restricting, by the first device, the first device's usage of the wireless channel according to the determined target share.

Various embodiments disclosed herein are related to a system of enforcing fairness in airtime utilization among devices including artificial reality devices. In some embodiments, the system as a first device configured to execute an application for artificial reality may include a wireless communication interface and a processor. The processor may be configured to monitor, via the wireless communication interface, a wireless channel. The processor may be configured to determine information about other devices using the wireless channel. The processor may be configured to determine a target share of the wireless channel for use by the first device in communicating data for the artificial reality, according to the information about the other devices using the wireless channel. The processor may be configured to access, via the wireless communication interface, the wireless channel according to (1) the target share of the wireless channel and (2) a combined level of usage of the wireless channel by the first device and the other devices.

In some implementations, the processor may be configured to monitor, via the wireless communication interface, the combined level of usage of the wireless channel by the first device and the other devices, and compare the combined level of usage with a utilization threshold. In some implementations, in accessing the wireless channel, the processor is configured to determine that the combined level of usage is within the utilization threshold when a level of usage of the first device is near or at the target share, and access the wireless channel beyond the target share responsive to the determining that the combined level of usage is within the utilization threshold when the level of usage of the first device is near or at the target share.

In some implementations, in determining the target share, the processor may be configured to determine a range for the target share according to the information about the other devices, and determine the target share in the range. In accessing the wireless channel, the processor may be configured to determine that the combined level of usage is near or approaching the utilization threshold, and responsive to the determining that the combined level of usage is near or approaching the utilization threshold, reduce the first device's access to wireless channel from the target share to a new target share that is greater than or equal to a minimum value of the range.

In some implementations, in monitoring the wireless channel, the processor may be configured to monitor the wireless channel using at least one of energy detection, inspection of a management frame, or sniffing wireless frames. In some implementations, in determining the information about the other devices, the processor may be configured to at least one of (1) determine a number of the other devices and the first device using the wireless channel, (2) determine a number of beacons transmitted in the wireless channel, (3) determine a number of distinct media access control (MAC) addresses of the other devices and the first device that are using the wireless channel, or (4) determine a number of distinct traffic classes over the other devices and the first device that are using the wireless channel.

In some implementations, in accessing the wireless channel, the processor may be configured to determine that data is available from the first device for communication via the wireless channel, and access, within a defined time from the data being available, the wireless channel according to the target share and the combined level of usage of the wireless channel. In some implementations, in accessing the wireless channel, the processor may be configured to access the target share of the wireless channel according to one or more time slots. The other devices may access the wireless channel using their respective time slots.

In some implementations, in accessing the target share of the wireless channel, the processor may be configured to determine that a second device of the other devices is not using a time slot allocated to the second device, and access the wireless channel using the time slot allocated to the second device, responsive to determining that the second device is not using the time slot allocated to the second device. In some implementations, in accessing the wireless channel, the processor may be configured to restrict the first device's usage of the wireless channel according to the determined target share.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Figure 1:
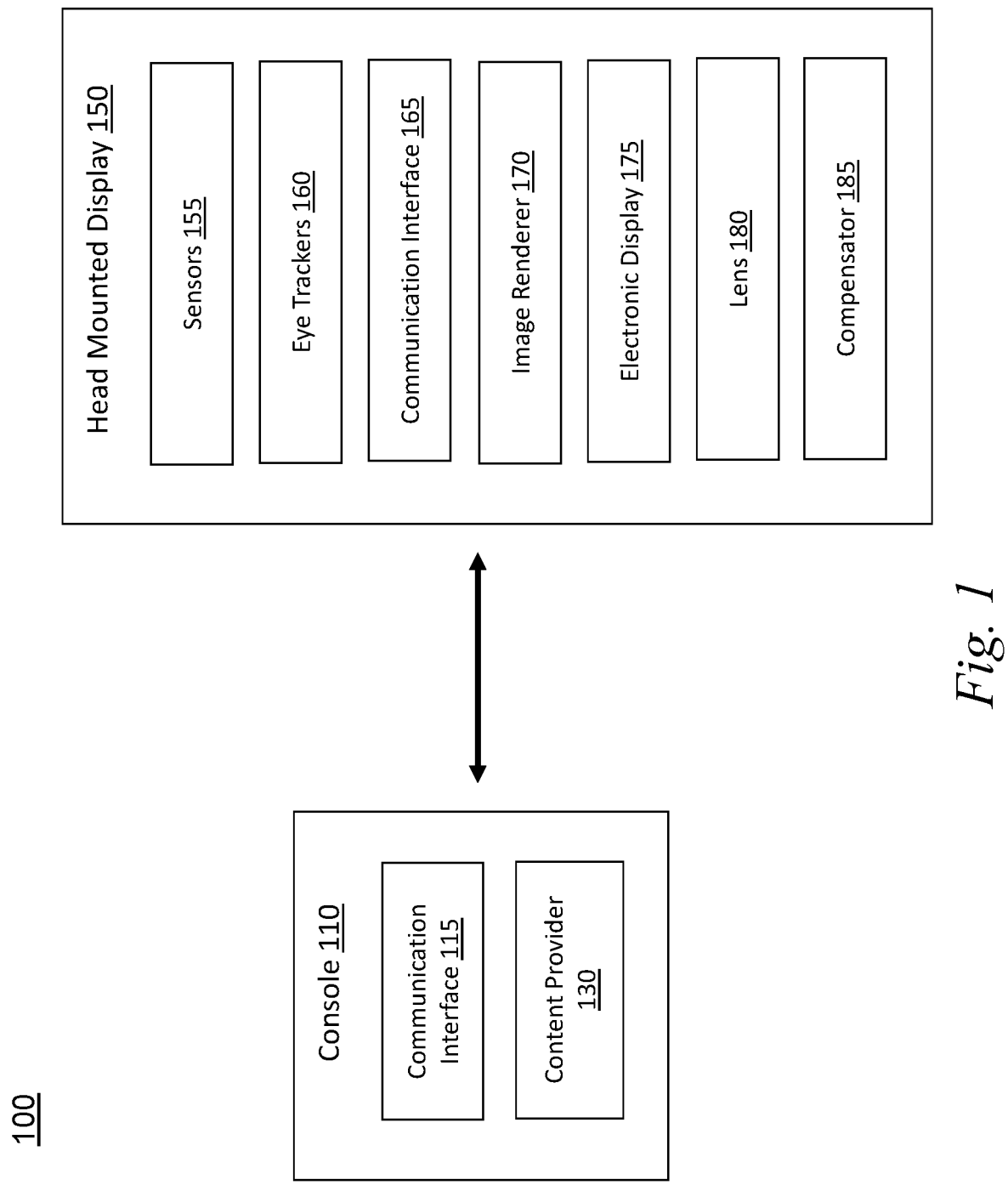
FIG. 1 is a diagram of a system environment including an artificial reality system, according to an example implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

The present disclosure relates generally to systems and methods for communication for rendering artificial reality. More particularly, the present disclosure relates to systems and methods for enforcing fairness in airtime utilization among devices including artificial reality devices while satisfying low latency.

Multiple artificial reality (e.g., AR or VR) applications may use a quality of service (QoS) enhanced wireless protocol which can give a higher probability of accessing the channel to a higher priority traffic (e.g., video or voice traffic). For example, multiple artificial reality applications may use enhanced distributed channel access (EDCA) in IEEE 802.11e. However, if such artificial reality applications co-exist on the same channel with other non-artificial reality applications, without ensuring or enforcing airtime fairness between artificial reality applications and non-artificial reality applications, non-artificial reality applications may be subject to unfair access to the channel.

For example, low latency artificial reality applications may require instantaneous access to the channel whenever data is present for transmission. In a conventional Wi-Fi network (e.g., IEEE 802.11 wireless network), devices contend for a shared medium (e.g., a wireless channel) and probabilistically win access to the channel, to ensure or enforce fairness in medium access. If Wi-Fi devices were to deterministically access the channel, they would cause collisions and lead to degraded performance. On the other hand, a Wi-Fi network is provided to enable differentiated services such as voice and video lower latency access to the medium. For example, the IEEE 802.11e standard specifies different Access Classes (AC) that have Enhanced Distributed Channel Access (EDCA) parameters, which are lower contention parameters as compared to best effort applications such as FTP (file transfer protocol) or Web browsing. The EDCA parameters include AIFS (Arbitration Inter-Frame Spacing), CWMin (Minimum Contention Window), CWMax (Minimum Contention Window), and TXOP (Transmission Opportunity), for example. The EDCA parameters can determine a relative priority of each device or traffic type to get on the medium. Although this scheme of providing differentiated services can improve the likelihood of channel access, it does not guarantee channel access as required for artificial reality applications. Moreover, such existing schemes essentially trade-off deterministic channel access for fairness among different classes of applications (e.g., artificial reality applications and non-artificial reality applications co-existing with each other). Therefore, there is a need to allow both deterministic channel access for artificial reality applications, whilst at the same time ensuring or enforcing fairness between artificial reality applications and other classes of applications.

To solve this problem, according to certain aspects, a more deterministic channel access may be provided for artificial reality devices while enforcing fairness between the artificial reality devices and other classes of devices or applications.

In one approach, a predefined slot can be allocated for each artificial reality application (or device) without random backoff in a time-division multiple access (TDMA) fashion while the size of a slot is limited to ensure or enforce fairness among all applications on the same channel including artificial reality applications or non-artificial reality applications. For example, multiple artificial reality applications can negotiate the size of the slot using beacons (e.g., beacon frames in IEEE 802.11 network), and when a slot is allocated, each artificial reality application can transfer its artificial reality traffic during the allocated slot. An artificial reality application may be a rendering pipeline of which upper layers can synchronize their timing to transmit artificial reality traffic with the allocated slot. For example, the upper layers can synchronize their timing with a lower networking layer or network hardware (e.g., Wi-Fi hardware). The size of slot may be determined based on (1) current bit rate of artificial reality applications, (2) frame rate of artificial reality applications, or (3) a smaller airtime of 1/n fair share (when there exist n applications in total) and an airtime each application actually needs.

In one approach, each artificial reality application (or device) may determine a fair airtime and access to a shared channel instantaneously for the fair air time when data is available from upper layers. The fair airtime may be duty-cycled by estimating a total channel utilization of all users (including non-artificial reality applications) on the same channel and calculating a backoff time for fairness among artificial reality applications and non-artificial reality applications. For example, each artificial reality application can calculate its fair airtime as 1/n fair share (when there exist n applications in total) and enforce the fair air time by itself.

In one approach, a method of enforcing fairness in airtime utilization among devices including artificial reality devices may be provided. The method may include monitoring, by a first device configured to execute an application for artificial reality, a wireless channel. The method may include determining, by the first device responsive to the monitoring, information about other devices using the wireless channel. The method may include determining, by the first device, a target share of the wireless channel for use by the first device in communicating data for the artificial reality, according to the information about the other devices using the wireless channel. The method may include accessing, by the first device, the wireless channel according to (1) the target share of the wireless channel and (2) a combined level of usage of the wireless channel by the first device and the other devices.

In one approach, a system of enforcing fairness in airtime utilization among devices including artificial reality devices may be provided. The system as a first device configured to execute an application for artificial reality may include a wireless communication interface and a processor. The processor may be configured to monitor, via the wireless communication interface, a wireless channel. The processor may be configured to determine information about other devices using the wireless channel. The processor may be configured to determine a target share of the wireless channel for use by the first device in communicating data for the artificial reality, according to the information about the other devices using the wireless channel. The processor may be configured to access, via the wireless communication interface, the wireless channel according to (1) the target share of the wireless channel and (2) a combined level of usage of the wireless channel by the first device and the other devices.

Implementations in the present disclosure have at least the following advantages and benefits.

First, implementations in the present disclosure can provide a TDMA scheme in which when a slot is allocated, each artificial reality application can transfer its artificial reality traffic during the allocated slot. The size of a slot can be limited based on (1) current bit rate of artificial reality applications, (2) frame rate of artificial reality applications, or (3) a smaller airtime of 1/n fair share (when there exist n applications in total) and an airtime each application actually needs, so as to meet the requirements of its low latency while enforcing fairness between artificial reality applications and other classes of applications.

Second, implementations in the present disclosure can provide instantaneous access to an artificial reality device when data is available from upper layers of the device, while the access time being duty-cycled to be a fair air time based on a total channel utilization of all users (including non-artificial reality applications) on the same channel. This configuration can provide a more dynamic way of enforcing fairness among devices on the same channel without allocating slots in a TDMA manner.

Third, implementations in the present disclosure can provide a method and a system for each device to calculate a fair air time as fair share and enforce it by itself without need of any additional coordinating mechanism (e.g., a negotiating protocol or an external enforcing device). For example, each device can (1) monitor its neighbors to detect traffic on the same channel and determine an amount of occupancy of the channel, (2) determine its fair airtime based on the occupancy amount, and (3) enforce fairness by itself based on the determined fair airtime.

FIG. 1 is a block diagram of an example artificial reality system environment 100. In some embodiments, the artificial reality system environment 100 includes a HWD 150 worn by a user, and a console 110 providing content of artificial reality to the HWD 150. The HWD 150 may be referred to as, include, or be part of a head mounted display (HMD), head mounted device (HMD), head wearable device (HWD), head worn display (HWD) or head worn device (HWD). The HWD 150 may detect its location and/or orientation of the HWD 150 as well as a shape, location, and/or an orientation of the body/hand/face of the user, and provide the detected location/or orientation of the HWD 150 and/or tracking information indicating the shape, location, and/or orientation of the body/hand/face to the console 110. The console 110 may generate image data indicating an image of the artificial reality according to the detected location and/or orientation of the HDM 150, the detected shape, location and/or orientation of the body/hand/face of the user, and/or a user input for the artificial reality, and transmit the image data to the HWD 150 for presentation. In some embodiments, the artificial reality system environment 100 includes more, fewer, or different components than shown in FIG. 1. In some embodiments, functionality of one or more components of the artificial reality system environment 100 can be distributed among the components in a different manner than is described here. For example, some of the functionality of the console 110 may be performed by the HWD 150. For example, some of the functionality of the HWD 150 may be performed by the console 110. In some embodiments, the console 110 is integrated as part of the HWD 150.

In some embodiments, the HWD 150 is an electronic component that can be worn by a user and can present or provide an artificial reality experience to the user. The HWD 150 may render one or more images, video, audio, or some combination thereof to provide the artificial reality experience to the user. In some embodiments, audio is presented via an external device (e.g., speakers and/or headphones) that receives audio information from the HWD 150, the console 110, or both, and presents audio based on the audio information. In some embodiments, the HWD 150 includes sensors 155, eye trackers 160, a hand tracker 162, a communication interface 165, an image renderer 170, an electronic display 175, a lens 180, and a compensator 185. These components may operate together to detect a location of the HWD 150 and a gaze direction of the user wearing the HWD 150, and render an image of a view within the artificial reality corresponding to the detected location and/or orientation of the HWD 150. In other embodiments, the HWD 150 includes more, fewer, or different components than shown in FIG. 1.

In some embodiments, the sensors 155 include electronic components or a combination of electronic components and software components that detect a location and an orientation of the HWD 150. Examples of the sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and the rotational movement, and determine an orientation and location of the HWD 150. In one aspect, the sensors 155 can detect the translational movement and the rotational movement with respect to a previous orientation and location of the HWD 150, and determine a new orientation and/or location of the HWD 150 by accumulating or integrating the detected translational movement and/or the rotational movement. Assuming for an example that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming for another example that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some embodiments, the eye trackers 160 include electronic components or a combination of electronic components and software components that determine a gaze direction of the user of the HWD 150. In some embodiments, the HWD 150, the console 110 or a combination of them may incorporate the gaze direction of the user of the HWD 150 to generate image data for artificial reality. In some embodiments, the eye trackers 160 include two eye trackers, where each eye tracker 160 captures an image of a corresponding eye and determines a gaze direction of the eye. In one example, the eye tracker 160 determines an angular rotation of the eye, a translation of the eye, a change in the torsion of the eye, and/or a change in shape of the eye, according to the captured image of the eye, and determines the relative gaze direction with respect to the HWD 150, according to the determined angular rotation, translation and the change in the torsion of the eye. In one approach, the eye tracker 160 may shine or project a predetermined reference or structured pattern on a portion of the eye, and capture an image of the eye to analyze the pattern projected on the portion of the eye to determine a relative gaze direction of the eye with respect to the HWD 150. In some embodiments, the eye trackers 160 incorporate the orientation of the HWD 150 and the relative gaze direction with respect to the HWD 150 to determine a gate direction of the user. Assuming for an example that the HWD 150 is oriented at a direction 30 degrees from a reference direction, and the relative gaze direction of the HWD 150 is −10 degrees (or 350 degrees) with respect to the HWD 150, the eye trackers 160 may determine that the gaze direction of the user is 20 degrees from the reference direction. In some embodiments, a user of the HWD 150 can configure the HWD 150 (e.g., via user settings) to enable or disable the eye trackers 160. In some embodiments, a user of the HWD 150 is prompted to enable or disable the eye trackers 160.

In some embodiments, the hand tracker 162 includes an electronic component or a combination of an electronic component and a software component that tracks a hand of the user. In some embodiments, the hand tracker 162 includes or is coupled to an imaging sensor (e.g., camera)

and an image processor that can detect a shape, a location and an orientation of the hand. The hand tracker 162 may generate hand tracking measurements indicating the detected shape, location and orientation of the hand.

In some embodiments, the communication interface 165 includes an electronic component or a combination of an electronic component and a software component that communicates with the console 110. The communication interface 165 may communicate with a communication interface 115 of the console 110 through a communication link. The communication link may be a wireless link. Examples of the wireless link can include a cellular communication link, a near field communication link, Wi-Fi, Bluetooth, 60 GHz wireless link, or any communication wireless communication link. Through the communication link, the communication interface 165 may transmit to the console 110 data indicating the determined location and/or orientation of the HWD 150, the determined gaze direction of the user, and/or hand tracking measurement. Moreover, through the communication link, the communication interface 165 may receive from the console 110 image data indicating or corresponding to an image to be rendered and additional data associated with the image.

In some embodiments, the image renderer 170 includes an electronic component or a combination of an electronic component and a software component that generates one or more images for display, for example, according to a change in view of the space of the artificial reality. In some embodiments, the image renderer 170 is implemented as a processor (or a graphical processing unit (GPU)) that executes instructions to perform various functions described herein. The image renderer 170 may receive, through the communication interface 165, image data describing an image of artificial reality to be rendered and additional data associated with the image, and render the image through the electronic display 175. In some embodiments, the image data from the console 110 may be encoded, and the image renderer 170 may decode the image data to render the image. In some embodiments, the image renderer 170 receives, from the console 110 in additional data, object information indicating virtual objects in the artificial reality space and depth information indicating depth (or distances from the HWD 150) of the virtual objects. In one aspect, according to the image of the artificial reality, object information, depth information from the console 110, and/or updated sensor measurements from the sensors 155, the image renderer 170 may perform shading, reprojection, and/or blending to update the image of the artificial reality to correspond to the updated location and/or orientation of the HWD 150. Assuming that a user rotated his head after the initial sensor measurements, rather than recreating the entire image responsive to the updated sensor measurements, the image renderer 170 may generate a small portion (e.g., 10%) of an image corresponding to an updated view within the artificial reality according to the updated sensor measurements, and append the portion to the image in the image data from the console 110 through reprojection. The image renderer 170 may perform shading and/or blending on the appended edges. Hence, without recreating the image of the artificial reality according to the updated sensor measurements, the image renderer 170 can generate the image of the artificial reality. In some embodiments, the image renderer 170 receives hand model data indicating a shape, a location and an orientation of a hand model corresponding to the hand of the user, and overlay the hand model on the image of the artificial reality. Such hand model may be presented as a visual feedback to allow a user to provide various interactions within the artificial reality.

In some embodiments, the electronic display 175 is an electronic component that displays an image. The electronic display 175 may, for example, be a liquid crystal display or an organic light emitting diode display. The electronic display 175 may be a transparent display that allows the user to see through. In some embodiments, when the HWD 150 is worn by a user, the electronic display 175 is located proximate (e.g., less than 3 inches) to the user's eyes. In one aspect, the electronic display 175 emits or projects light towards the user's eyes according to image generated by the image renderer 170.

In some embodiments, the lens 180 is a mechanical component that alters received light from the electronic display 175. The lens 180 may magnify the light from the electronic display 175, and correct for optical error associated with the light. The lens 180 may be a Fresnel lens, a convex lens, a concave lens, a filter, or any suitable optical component that alters the light from the electronic display 175. Through the lens 180, light from the electronic display 175 can reach the pupils, such that the user can see the image displayed by the electronic display 175, despite the close proximity of the electronic display 175 to the eyes.

In some embodiments, the compensator 185 includes an electronic component or a combination of an electronic component and a software component that performs compensation to compensate for any distortions or aberrations. In one aspect, the lens 180 introduces optical aberrations such as a chromatic aberration, a pin-cushion distortion, barrel distortion, etc. The compensator 185 may determine a compensation (e.g., predistortion) to apply to the image to be rendered from the image renderer 170 to compensate for the distortions caused by the lens 180, and apply the determined compensation to the image from the image renderer 170. The compensator 185 may provide the predistorted image to the electronic display 175.

In some embodiments, the console 110 is an electronic component or a combination of an electronic component and a software component that provides content to be rendered to the HWD 150. In one aspect, the console 110 includes a communication interface 115 and a content provider 130. These components may operate together to determine a view (e.g., a FOV of the user) of the artificial reality corresponding to the location of the HWD 150 and the gaze direction of the user of the HWD 150, and can generate image data indicating an image of the artificial reality corresponding to the determined view. In addition, these components may operate together to generate additional data associated with the image. Additional data may be information associated with presenting or rendering the artificial reality other than the image of the artificial reality. Examples of additional data include, hand model data, mapping information for translating a location and an orientation of the HWD 150 in a physical space into a virtual space (or simultaneous localization and mapping (SLAM) data), eye tracking data, motion vector information, depth information, edge information, object information, etc. The console 110 may provide the image data and the additional data to the HWD 150 for presentation of the artificial reality. In other embodiments, the console 110 includes more, fewer, or different components than shown in FIG. 1. In some embodiments, the console 110 is integrated as part of the HWD 150.

In some embodiments, the communication interface 115 is an electronic component or a combination of an electronic component and a software component that communicates with the HWD 150. The communication interface 115 may be a counterpart component to the communication interface 165 to communicate with a communication interface 115 of the console 110 through a communication link (e.g., wireless link). Through the communication link, the communication interface 115 may receive from the HWD 150 data indicating the determined location and/or orientation of the HWD 150, the determined gaze direction of the user, and the hand tracking measurement. Moreover, through the communication link, the communication interface 115 may transmit to the HWD 150 image data describing an image to be rendered and additional data associated with the image of the artificial reality.

The content provider 130 can include or correspond to a component that generates content to be rendered according to the location and/or orientation of the HWD 150. In some embodiments, the content provider 130 may incorporate the gaze direction of the user of the HWD 150, and a user interaction in the artificial reality based on hand tracking measurements to generate the content to be rendered. In one aspect, the content provider 130 determines a view of the artificial reality according to the location and/or orientation of the HWD 150. For example, the content provider 130 maps the location of the HWD 150 in a physical space to a location within an artificial reality space, and determines a view of the artificial reality space along a direction corresponding to the mapped orientation from the mapped location in the artificial reality space. The content provider 130 may generate image data describing an image of the determined view of the artificial reality space, and transmit the image data to the HWD 150 through the communication interface 115. The content provider 130 may also generate a hand model corresponding to a hand of a user of the HWD 150 according to the hand tracking measurement, and generate hand model data indicating a shape, a location, and an orientation of the hand model in the artificial reality space. In some embodiments, the content provider 130 may generate additional data including motion vector information, depth information, edge information, object information, hand model data, etc., associated with the image, and transmit the additional data together with the image data to the HWD 150 through the communication interface 115. The content provider 130 may encode the image data describing the image, and can transmit the encoded data to the HWD 150. In some embodiments, the content provider 130 generates and provides the image data to the HWD 150 periodically (e.g., every 11 ms). In one aspect, the communication interface 115 can adaptively transmit the additional data to the HWD 150 as described below with respect to FIGS. 3 through 6.

Figure 2:
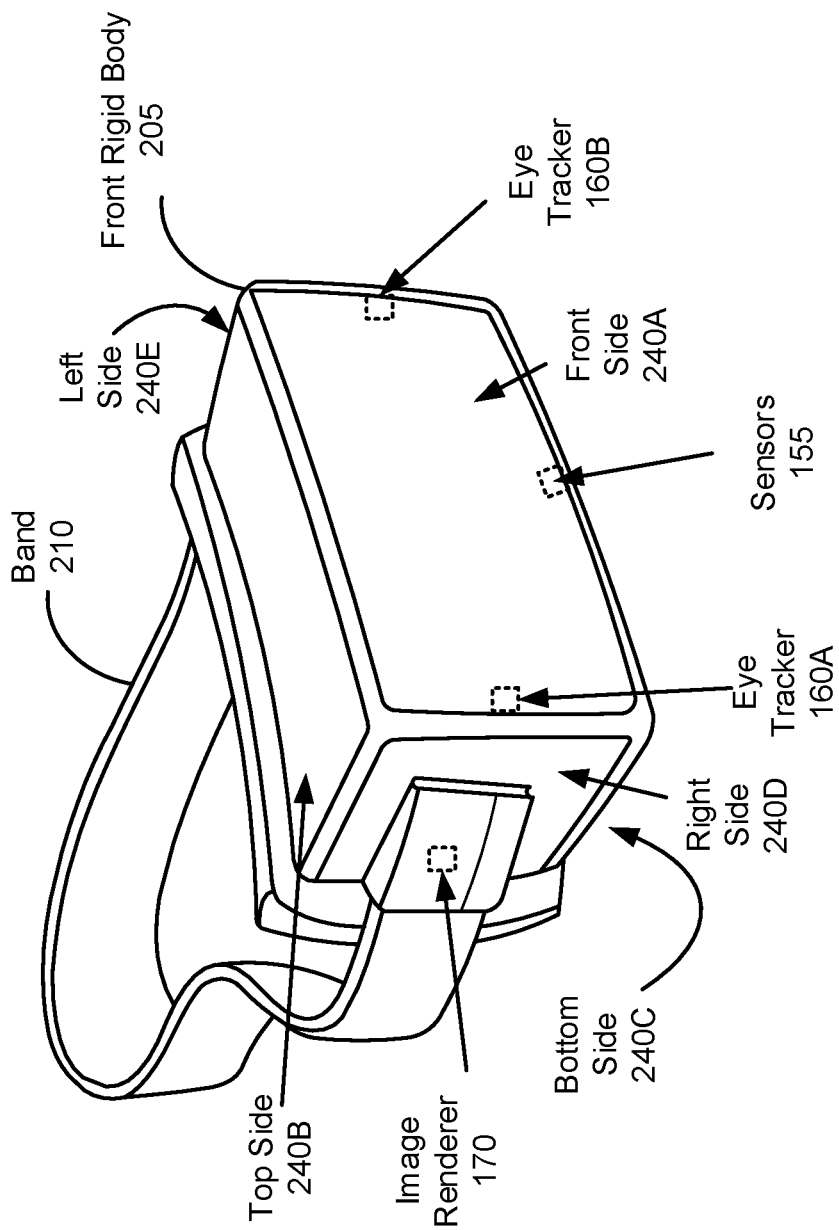
FIG. 2 is a diagram of a head wearable display, according to an example implementation of the present disclosure.

FIG. 2 is a diagram of a HWD 150, in accordance with an example embodiment. In some embodiments, the HWD 150 includes a front rigid body 205 and a band 210. The front rigid body 205 includes the electronic display 175 (not shown in FIG. 2), the lens 180 (not shown in FIG. 2), the sensors 155, the eye trackers 160A, 160B, the communication interface 165, and the image renderer 170. In the embodiment shown by FIG. 2, the communication interface 165, the image renderer 170, and the sensors 155 are located within the front rigid body 205, and may not visible to the user. In other embodiments, the HWD 150 has a different configuration than shown in FIG. 2. For example, the communication interface 165, the image renderer 170, the eye trackers 160A, 160B, and/or the sensors 155 may be in different locations than shown in FIG. 2.

Figure 3:
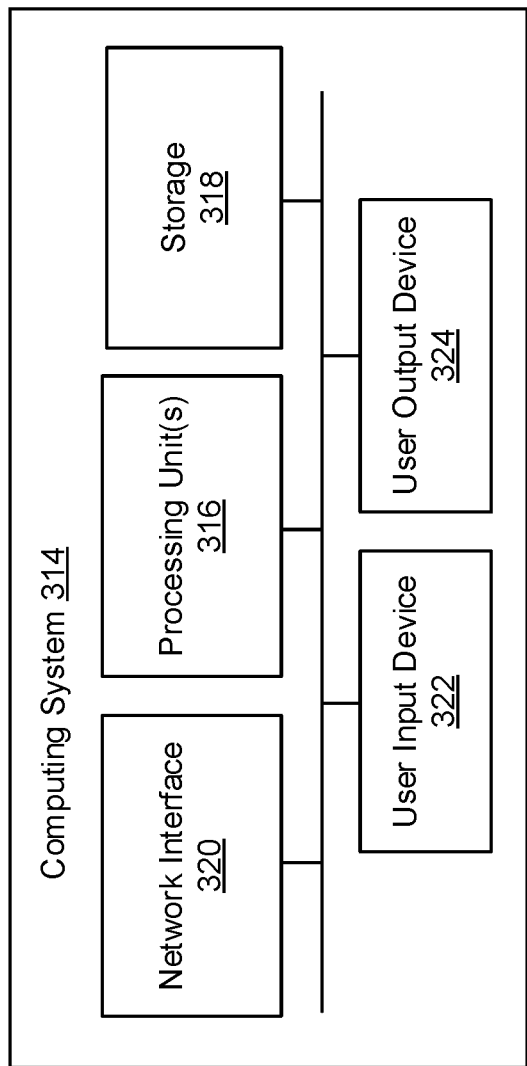
FIG. 3 is a block diagram of a computing environment according to an example implementation of the present disclosure.

FIG. 3 shows a block diagram of a representative computing system 314 usable to implement the present disclosure. In some embodiments, the console 110, the HWD 150 or both of FIG. 1 are implemented by the computing system 314. Computing system 314 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 314 can be implemented to provide VR, AR, MR experience. In some embodiments, the computing system 314 can include conventional computer components such as processors 316, storage device 318, network interface 320, user input device 322, and user output device 324.

Network interface 320 can provide a connection to a wide area network (e.g., the Internet) to which WAN interface of a remote server system is also connected. Network interface 320 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 322 can include any device (or devices) via which a user can provide signals to computing system 314; computing system 314 can interpret the signals as indicative of particular user requests or information. User input device 322 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 324 can include any device via which computing system 314 can provide information to a user. For example, user output device 324 can include a display to display images generated by or delivered to computing system 314. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 324 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 316 can provide various functionality for computing system 314, including any of the functionality described herein as being performed by a server or client, or other functionality associated with message management services.

It will be appreciated that computing system 314 is illustrative and that variations and modifications are possible. Computer systems used in connection with the present disclosure can have other capabilities not specifically described here. Further, while computing system 314 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Various operations described herein can be implemented on computer systems having the configuration that is same as or similar to that of the computing system 314.

Figure 4:
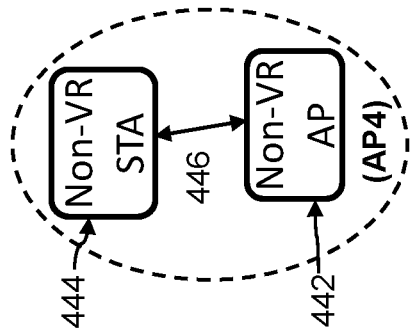
FIG. 4 is a diagram of a system environment in which devices including artificial reality devices are communicated using basic service sets (BSSs) of a wireless network, according to an example implementation of the present disclosure.
Figure 4:
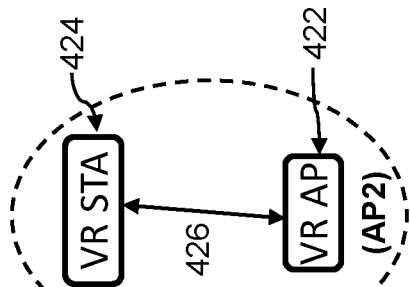
Figure 4:
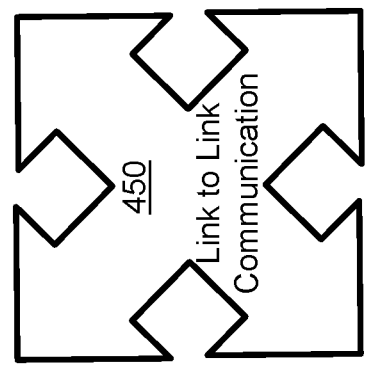
Figure 4:
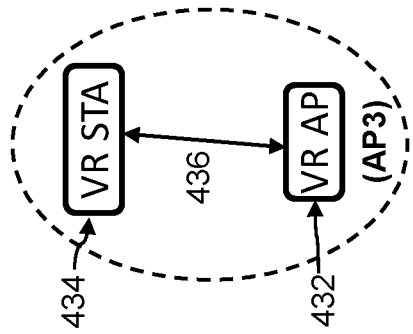
Figure 4:
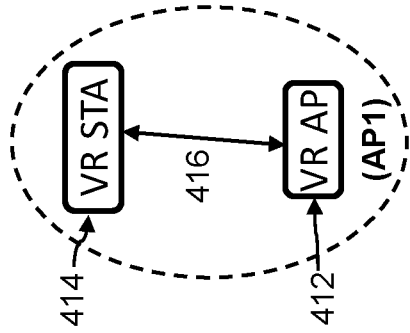

FIG. 4 is a diagram of a system environment in which devices including artificial reality devices are communicated using basic service sets (BSSs) of a wireless network, according to an example implementation of the present disclosure.

Referring to FIG. 4, a user #1 or BSS #1 (denoted by 410) includes a pair of AP1 (access point) 412 and a station 414 communicating 416 with AP1 via a shared wireless medium 450 (e.g., the same wireless channel in a wireless network). Here, the wireless network may be, but not limited to, wireless local area network (LAN), wireless personal area network (PAN), wireless ad hoc network, or wireless metropolitan area network (MAN). Similarly, a user #2 or BSS #2 (denoted by 420) includes a pair of AP2 (access point) 422 and a station 424 communicating 426 with AP2 via the shared wireless medium 450, and a user #3 or BSS #3 (denoted by 430) includes a pair of AP3 (access point) 432 and a station 434 communicating 436 with AP3 via the shared wireless medium 450. In some implementations, each of AP1, AP2, and AP3 may be an artificial reality device (e.g., artificial reality console), and the stations 414, 424, 434 may be artificial reality devices (e.g., HWDs) respectively communicating with AP1, AP2, AP3. A user #4 or BSS #4 (denoted by 440) includes a pair of AP4 (access point) 442 and a station 444 communicating 446 with AP4 via the shared wireless medium 450. In some implementations, AP4 may be a non-artificial reality AP (access point), and the station 444 may be a non-artificial reality station.

In some implementations, AP1, AP2, AP3 and AP4 may communicate wireless frames via the shared wireless medium 450 so that each AP can detect frames communicated by other APs. For example, in an 802.11 Wi-Fi network, AP1 may communicate a data frame or a management frame (e.g., beacon frame) via a wireless channel so that other APs (e.g., AP2, AP3, AP4) can detect the data frame or the management frame. In some implementations, AP1, AP2, AP3 and AP4 may communicate frames using broadcast, unicast (to a particular destination device) or multicast (to a set of destination devices).

Now, various systems or methods of enforcing fairness in airtime utilization among devices including artificial reality devices according to some implementations of the present disclosure will be described with reference to FIG. 4.

Figure 5A:
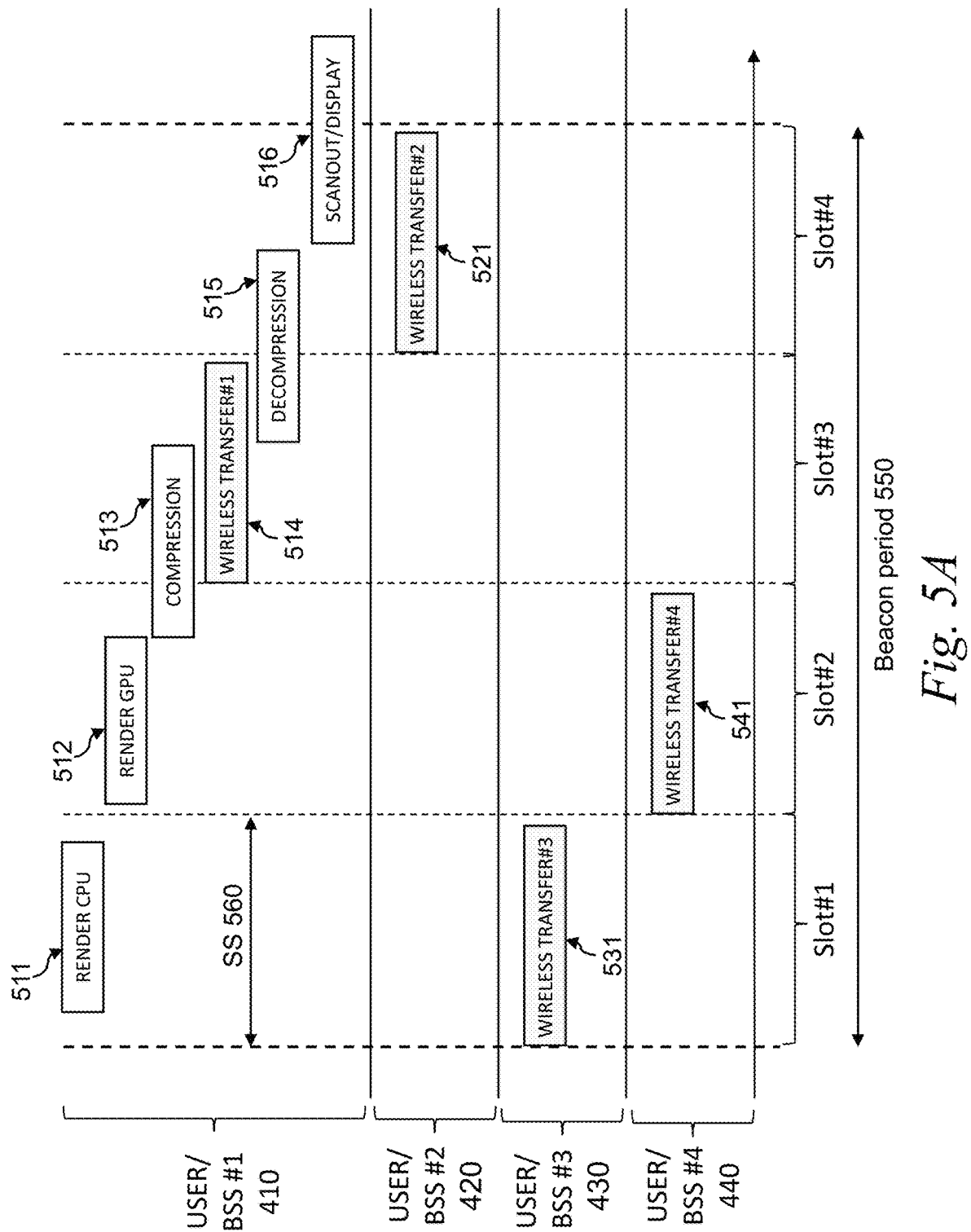
FIG. 5A and FIG. 5B are each an example timing diagram of communications of devices including artificial reality devices in the system environment shown in FIG. 4, according to an example implementation of the present disclosure.
Figure 5B:
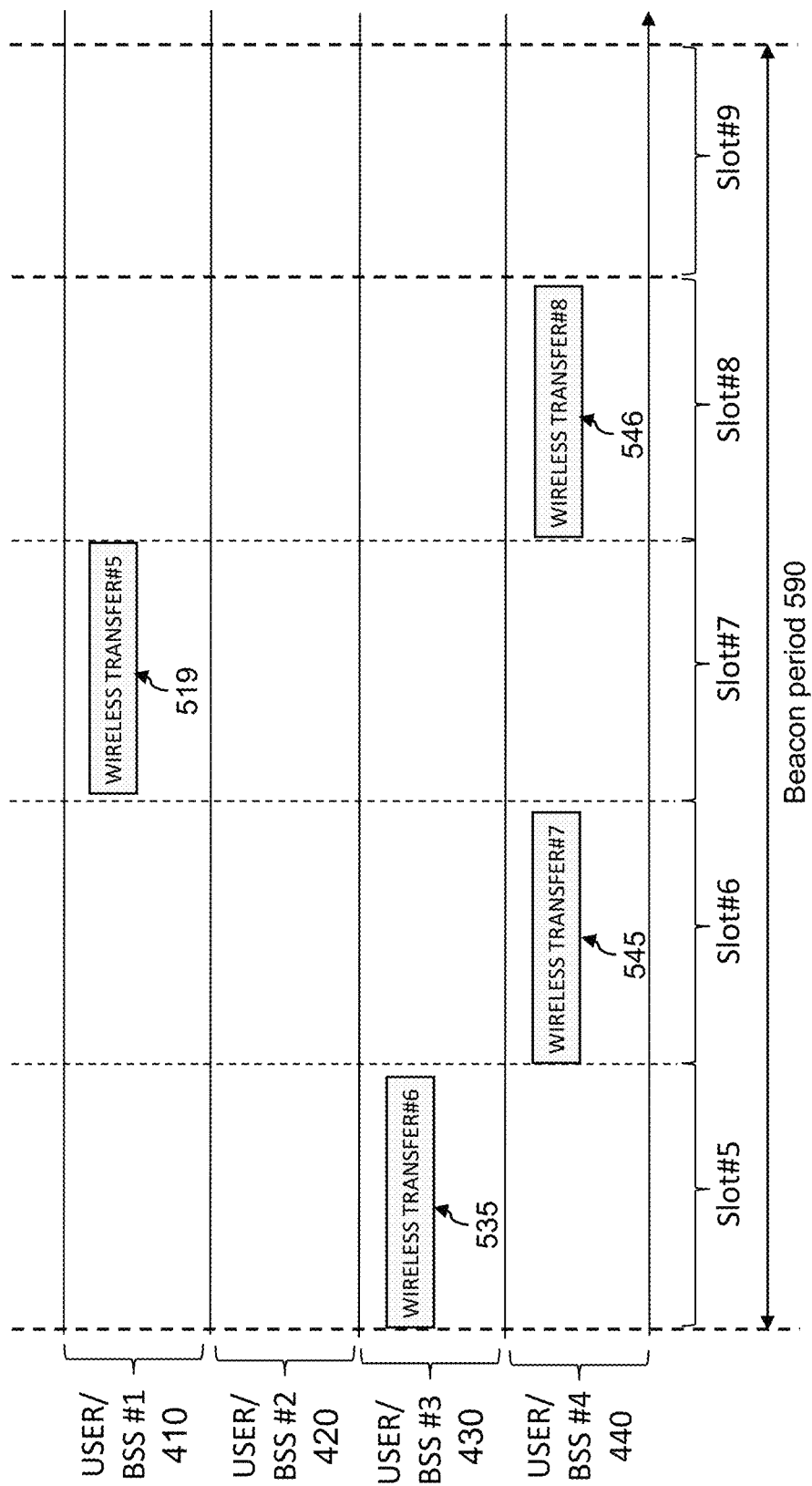

FIG. 5A and FIG. 5B are each an example timing diagram of communications of devices including artificial reality devices in the system environment shown in FIG. 4, according to an example implementation of the present disclosure.

FIG. 5A shows that during a beacon period 550, artificial reality devices in the USER/BSS #1, USER/BSS #2, USER/BSS #3 and a non-artificial reality device in the USER/BSS #4 perform wireless transfer #1 (denoted by 514), wireless transfer #2 (denoted by 521), wireless transfer #3 (denoted by 531), and wireless transfer #4 (denoted by 541), respectively, via the shared wireless medium 450. In some implementations, a predefined slot is allocated for each artificial reality application (or device) or non-artificial reality application (or device) without random backoff in a time-division multiple access (TDMA) fashion. For example, as shown in FIG. 5A, slot #1, slot #2, slot #3, and slot #4 are allocated for USER/BSS #3, USER/BSS #4, USER/BSS #1, and USER/BSS #2, respectively. In some implementations, slots may be static as it remains in a certain duration of the beacon period. In some implementations, each slot may be a wireless schedule basic unit, thereby providing a deterministic access to a corresponding device (e.g., artificial reality device or non-artificial reality device). In other words, within this time slot, the corresponding device can get a deterministic access to the medium (e.g., a wireless channel) and transmit frames without contending for the medium.

In some implementations, slots may be defined such that each device is limited in its duty cycle (in terms of airtime utilization) and can only transmit for up to a maximum duration which is approximately equal to a size of slot (e.g., slot size 560 in FIG. 5A), to ensure fairness in airtime utilization among devices on the same channel (including artificial reality devices or non-artificial reality devices). In some implementations, the size and position of slot may be configurable or negotiated. For example, each device (e.g., artificial reality device or non-artificial reality device) may predefine a particular time slot (in terms of size and position) for periodically accessing the channel by advertising the slot to other devices in a wireless frame (e.g., management frames in IEEE 802.11 network). Multiple devices (e.g., artificial reality devices or non-artificial reality devices) can negotiate the size and position of slot by transmitting management frames (e.g., beacon frames in IEEE 802.11 network) so that each device can detect size and position of slot other device prefers or proposes and can transmit a management frame as a response to the other device's proposal. The response of the device may indicate its desirable size and position of slot that are consistent with the detected size and position of slot (if the device agrees with other device's proposal) or a desirable size and position of slot that are not consistent with the detected size and position of slot (if the device disagrees with other device's proposal). In some implementations, this negotiation can continue until the majority or all of the devices on the medium agree (e.g., the majority or all of the devices transmit their desirable sizes and positions of slots that are consistent with each other). When a slot is allocated, each device can transfer its traffic during the allocated slot. In some implementations, the time slot used for deterministic access can be adjusted in size and position relative to the beacon period (e.g., the beacon period 550 in FIG. 5A). The adjustment of the size and position of slot may be performed in a manner similar to the definition of slot as described above. For example, adjusted size and position of a slot can be advertised and/or negotiated by devices (e.g., APs) during a few beacon periods before the adjustment is applied.

In some implementations, each application/device may determine the size of slot (as a target share of the medium) based on (1) current bit rate of artificial reality applications/devices, (2) frame rate of artificial reality applications/devices, or (3) a smaller airtime of a fair share airtime and an airtime each application/device actually needs. In some implementations, the fair share airtime may be a 1/n fair share (when there exist n applications/devices in total). For example, each application/device may calculate a 1/n fair share based on the number of different devices or wireless links it observes or monitors in its vicinity on the wireless medium (e.g., by sniffing traffic on the medium and detecting the number of different devices or wireless links on the medium). In some implementations, if there are n pairs of wireless devices forming n number of wireless links, then a fair share airtime can be 1/n of the available airtime. For example, as shown in FIG. 5A, there are 4 wireless links (USER/BSS #1, USER/BSS #2, USER/BSS #3, USER/BSS #4) and a fair share airtime can be ¼ of the available airtime (e.g., ¼ of the beacon period 550).

In some implementations, each application/device may determine or calculate the size of slot (as a target share of the medium) based on an amount of occupancy of the medium (or channel) by other applications/devices. For example, each application/device may observe or monitor neighbor applications/devices on the medium (e.g., those in vicinity) to detect traffic transmitted on the same channel or measure the energy of transmitted wireless signals on the same channel. Each application/device can determine, based on the detected traffic or measured energy, an amount of occupancy of the channel by other applications/devices. For example, if the amount of occupancy of the channel by other applications/devices is 10% of a beacon period, an application/device can determine its target share airtime as approximately 90% of the beacon period. In some implementations, when a first device or wireless link transmits traffic during a fair share air time, the airtime may be fragmented which might prevent the first device or wireless link from achieving its fair share in a contiguous manner. In such cases, a coordination process can be performed such that the first device (e.g., an AP) requests other devices (e.g. other APs) to adjust or move or slide their allocated slots to an earlier or later point than that of the first device in time to accommodate a contiguous fair allocation for the first device. In some implementations, to facilitate such coordination process, all of devices (e.g., all APs) may broadcast their current schedule (or slot allocation) and/or a request for future or potential airtime allocations.

In some implementations, each application/device may determine the (actual) transmission duration in a slot based on a combination of application requirements and a maximum allowable duration of transmission on the channel (which is approximately equal to the size of slot). For example, the slot duration can be computed as a minimum of a transmission duration required by the application and the maximum allowable duration of transmission.

In some implementations, an artificial reality application (e.g., an application running on artificial reality devices 412, 414, 422, 424, 432, 434 in FIG. 4) may be a rendering pipeline including upper layers. For example, as shown in FIG. 5A, upper layers of an artificial reality application may be configured to process CPU rendering 511, GPU rendering 512, compression 513 which are performed by an artificial reality console (e.g., the device 412 in FIG. 4), and decompression 515 and scanout/display 516, which are performed by an HWD (e.g., the device 414 in FIG. 4). In some implementations, the upper layers of an artificial reality application can synchronize their timing to transmit artificial reality traffic with the slot allocated to the application. For example, as shown in FIG. 5A, the artificial reality application running on the device 412 may synchronize the processing of CPU rendering 511, GPU rendering 512, compression 513 with the slot #3 allocated to the artificial reality application so as to transmit traffic during the slot #3 (the wireless transfer #1). Similarly, the same artificial reality application running on the device 414 may synchronize the processing of decompression 515 and scanout/display 516 with the slot #3 allocated to the artificial reality application so as to receive the traffic during the slot #3 (the wireless transfer #1). In some implementations, the upper layers of an application can be aware of a slot allocated to the application (e.g., the upper layers can deterministically calculate or predict a time when the slot will be available for transmission) and can prepare data for transmission in advance of the time. For example, as shown in FIG. 5A, the upper layers of the device 412 perform CPU rendering 511, GPU rendering 512, and compression 513 in advance of the time of the slot #3. In some implementations, the upper layers of an artificial reality application can be aware of the allocation by implementing a time synchronization between the rendering pipeline and a lower networking layer/a network hardware (e.g., a Wi-Fi hardware or a lower networking layer controlling the Wi-Fi hardware). In some implementations, an artificial reality application/device may define or adjust a position of a slot (via negotiating with other applications/devices as described above, for example) based on a predicted time point to start wireless data transfer. Artificial reality applications/devices can easily predict such time points for wireless data transfer based on characteristics of video data. Once a slot is allocated to an artificial reality application, the application may schedule its subsystems (e.g., upper layers 511, 512, 513 of rendering pipeline in FIG. 5A) based on the allocated slot for wireless transfer, thereby aligning itself to the availability of the slot and obtaining an instantaneous access to the channel during the slot.

Once a slot is assigned for transmission of frames by an application/device, it is expected that the application/device should utilize that slot for transmission. In some implementations, other applications/devices may detect that the slot is not used for transmission. For example, a device may determine whether or not the slot is used by sensing the medium for idle or busy. In some implementations, if a device (e.g., a malicious device) allocates a slot for itself and subsequently does not transmit data in that slot, other devices can contend for that slot after a fixed amount of time has passed, using standard Wi-Fi contention parameters (e.g., DCF inter-frame spacing (DIFS) or arbitration inter-frame spacing (AIFS)), thereby preventing wastage of slot airtime allocated by such devices.

In some implementations, more than one slot can be assigned to a user per Beacon period, for example, if slots are not contiguous. In some implementations, there can exist a slot unallocated to any user during a beacon period. In some implementations, there can exist a user to whom no slot is allocated during a beacon period. FIG. 5B shows these various implementations.

Referring to FIG. 5B, that during a beacon period 590, artificial reality devices in the USER/BSS #1, USER/BSS #3 and a non-artificial reality device in the USER/BSS #4 perform wireless transfer #5 (denoted by 519), wireless transfer #6 (denoted by 535), wireless transfer #7 (denoted by 545), and wireless transfer #8 (denoted by 546), via the shared wireless medium 450. In some implementations, a predefined slot (e.g., slot #5, slot #6, slot #7, slot #8, slot #9) during the beacon period is allocated for an artificial reality application (or device) or a non-artificial reality application (or device) without random backoff. For example, as shown in FIG. 5B, slot #5 and slot #7 are allocated for USER/BSS

3 and USER/BSS #1, respectively. In some implementations, more than one slot (e.g., slot #6 and slot #8) can be assigned to a user (e.g., USER/BSS #4) per Beacon period (e.g., the beacon period 590), for example, if slots are not contiguous. In some implementations, there can exist a slot (e.g., slot #9) unallocated to any user during a beacon period (e.g., the beacon period 590). In some implementations, there can exist a user (e.g., USER/BSS #2) to whom no slot is allocated during a beacon period (e.g., the beacon period 590).

Figure 6:
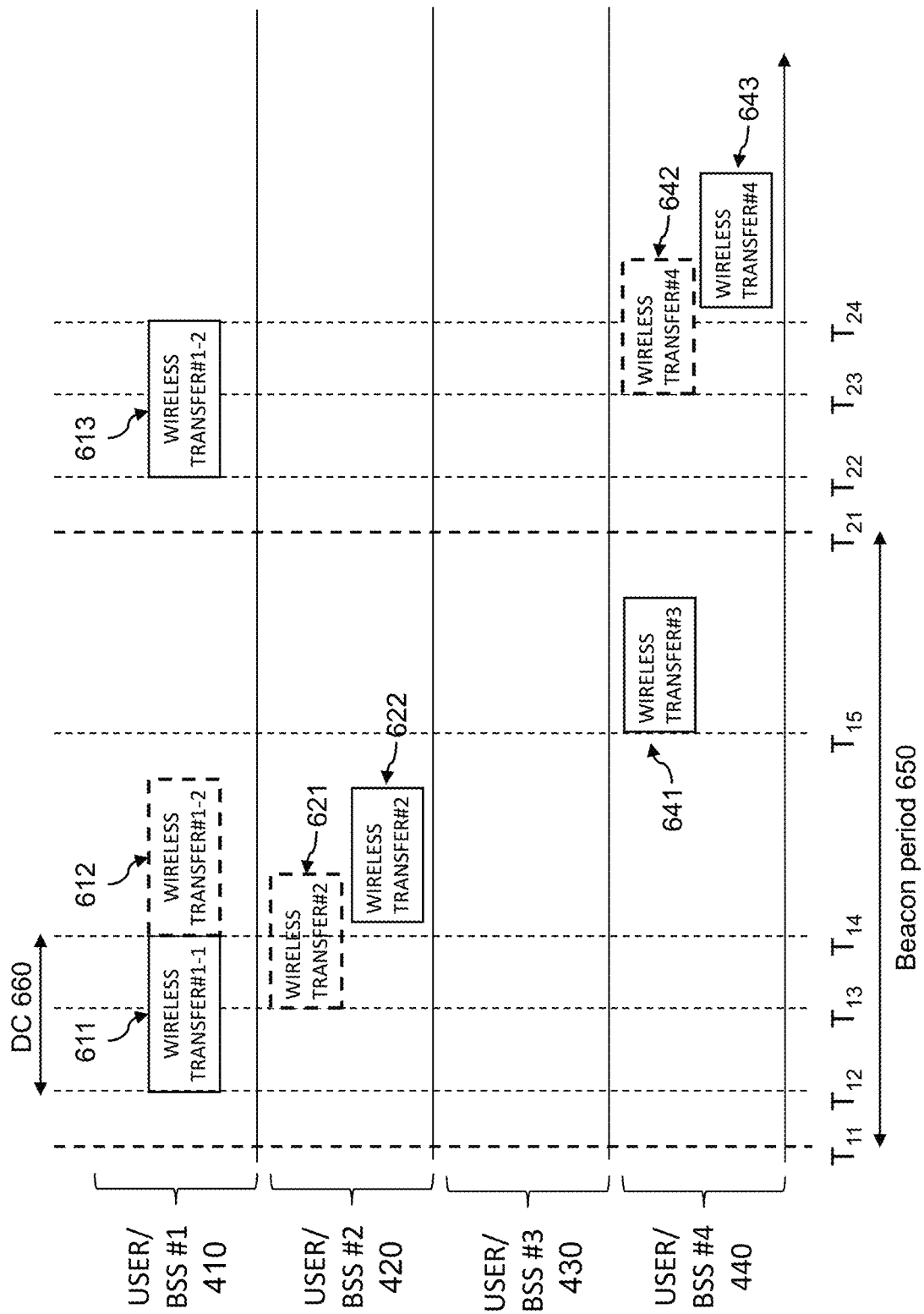
FIG. 6 is an example timing diagram of communications of devices including artificial reality devices in the system environment shown in FIG. 4, according to another example implementation of the present disclosure.

FIG. 6 is an example timing diagram of communications of devices including artificial reality devices in the system environment shown in FIG. 4, according to another example implementation of the present disclosure.

In some implementations, each application/device (e.g., artificial reality application/device or non-artificial reality application/device) may determine a fair airtime and access to a shared channel instantaneously without contention delay (e.g., within a defined time) for the fair air time when data is available from upper layers. For example, in the IEEE 802.11 network, instantaneous access to the channel may be implemented by accessing the channel within a time less than DIFS or AIFS when data is available from upper layers. As shown in FIG. 6, during a beacon period 650 between time $T_{11}$ and $T_{21}$, the USER/BSS #1 accesses the medium at $T_{12}$ when data is available from upper layers of the application running on the device 412 or the device 414 (see FIG. 4). In some implementations, the fair share airtime may be a 1/n fair share (when there exist n applications/devices in total) as described above. For example, as shown in FIG. 6, if an application/device observes that there are only three wireless links or BSSs (e.g., USER/BSS #1, USER/BSS #2, USER/BSS #4) using the medium, the fair share airtime may be a ⅓ fair share of the beacon period 650.

In some implementations, after accessing the channel instantaneously (without contention delay) to transmit data over the channel, the transmission may be duty-cycled to allow fairness in channel access with other devices or links that are also trying to access the channel. In some implementations, the air time may be duty-cycled to the determined fair airtime (e.g., a 1/n fair share when there exist n applications/devices in total). In some implementations, the fair airtime may be further duty-cycled by estimating a total channel utilization of all users (including non-artificial reality applications) on the same channel and calculating a backoff time to minimize congestion/utilization on the channel for fairness among artificial reality applications and non-artificial reality applications. For example, if the current amount of occupancy of the channel by other applications/devices is 90% of a beacon period, the airtime may be duty-cycled to 10% of the beacon period. Once a transmit duty cycle is calculated, each device (e.g., the wireless MAC layer of the device) can enforce the duty-cycled air time by itself. This ensures some fairness in airtime utilization on the shared channel while guaranteeing low latency for artificial reality applications/devices.

Referring to FIG. 6, a device in USER/BSS #1 (e.g., the device 412 or the device 414) determines a transmit duty cycle (e.g., DC 660). After accessing the channel instantaneously to wirelessly transmit data over the channel, the device in USER/BSS #1 performing duty cycling on the wireless transfer to the determined transmit duty cycle so that only a portion of the whole wireless data (wireless transfer #1-1 denoted by 613) is transferred and the remaining portion (wireless transfer #1-2 denoted by 612) is not transferred during the current beacon period 650. The device in USER/BSS #1 transfers the remaining portion of the whole wireless data (wireless transfer #1-2 denoted by 613) at $T_{22}$ in the next beacon period.

A device in USER/BSS #2 (e.g., the device 422 or the device 424) determines a transmit duty cycle and tries to access the channel instantaneously at $T_{13}$. The device in USER/BSS #2, however, detects that the channel is busy and backs off the transmission until the device in USER/BSS #1 completes the wireless transfer #1-1 at $T_{14}$. Instead of transferring data at $T_{13}$ (wireless transfer #2 denoted by 621), the device in USER/BSS #2 accesses the channel instantaneously (e.g., within a defined time from $T_{14}$) to perform wireless transfer (wireless transfer #2 denoted by 622) within the determined transmit duty cycle.

A device in USER/BSS #4 (e.g., the device 442 or the device 444) may determine a transmit duty cycle and access the channel instantaneously at $T_{15}$ to transmit data over the channel (wireless transfer #3 denoted by 641) within the determined transmit duty cycle. In the next beacon period, the device in USER/BSS #4 tries to access the channel instantaneously at $T_{23}$ to transmit data (wireless transfer #4 denoted by 642), however, detects that the channel is busy, and backs off the transmission until the device in USER/BSS #1 completes the wireless transfer #1-2 at $T_{24}$. The device in USER/BSS #4 accesses the channel instantaneously (e.g., within a defined time from $T_{24}$) to perform wireless transfer (wireless transfer #4 denoted by 643) within the determined transmit duty cycle.

In some implementations, multiple neighboring users or applications or devices can use TDMA slots (e.g., TDMA slots shown in FIG. 5A) while only one user/application/device can use instantaneous access for a limited period of time. For example, when there is no other user/application/device using the channel, a first device (which may be an artificial reality device) can use instantaneous access as described above, and when a second device starts accessing or sharing the channel, a TDMA slot based method can start so that both the first and second devices will allocate their respective TDMA slots.

In some implementations, when the IEEE 802.11e standard is used, a dynamic adjustment of EDCA parameters can be performed to ensure or enforce fairness in airtime among devices. In some implementations, when an artificial reality application or device deterministically accesses the medium (or channel) to burst a video frame, the application or device can leverage or utilize aggressive EDCA parameters to acquire the medium instantaneously (e.g., within a defined time without contention delay) for transmission of the first packet of the video frame. For example, the smallest value of AIFS may be used for such instantaneous access to the medium. However, after the first packet is transmitted, the application or device can adjust its EDCA parameters to moderate or default values for the remaining duration of its video frame burst. For example, after the first packet is transmitted, AIFS may be adjusted to a value that is greater than the value used for the transmission of the first packet. Thus, while using such moderate or default EDCA parameters, at any point during its transmission of the video frame burst, the medium can be idle (e.g., because the graphics pipeline is unable to serve a continuous stream of packets), and the application or device will have to contend for the medium using the moderate EDCA parameters. With this configuration, fairness can be ensured or enforced for other applications or devices to access the medium in case the application or device is unable to fully utilize the airtime.

Figure 7:
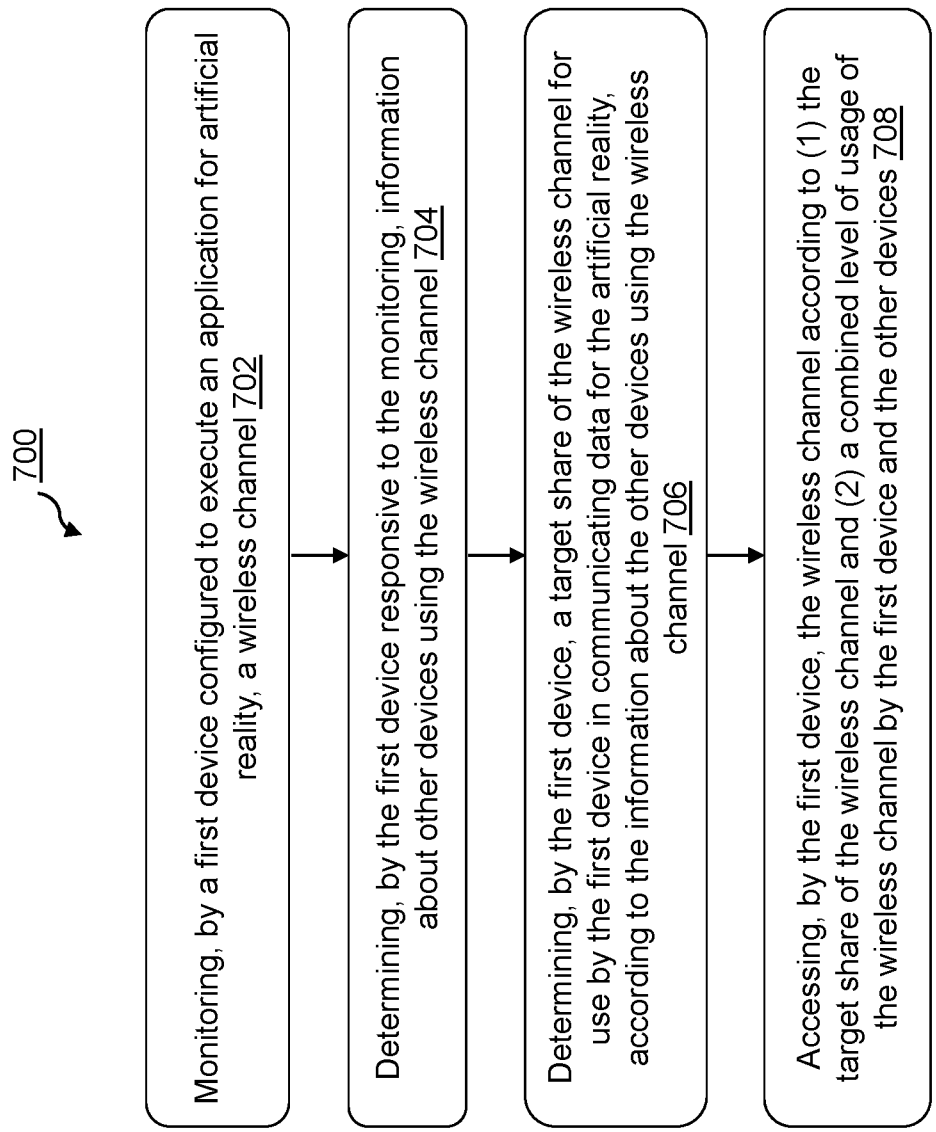
FIG. 7 shows a flow diagram of an example process of enforcing fairness in airtime utilization among devices including artificial reality devices, according to an example implementation of the present disclosure.

FIG. 7 shows a flow diagram of an example process of enforcing fairness in airtime utilization among devices including artificial reality devices, according to an example implementation of the present disclosure. In some embodiments, the process 700 includes more, fewer, or different steps than shown in FIG. 7. In some embodiments, a first device (e.g., AP1 denoted by 412 in FIG. 4) configured to execute an application for artificial reality may include a wireless communication interface (e.g., network interface 320 in FIG. 3) and a processor (e.g., processing unit 316 in FIG. 3).

In a process 702, the processor of the first device may monitor, via the wireless communication interface, a wireless channel (e.g., the wireless medium or channel 450 in FIG. 4). For example, the first device (e.g., AP1 in FIG. 4) can sniff wireless traffic on the wireless channel to detect data or management frames transmitted by other devices (e.g., AP2, AP3, AP4 in FIG. 4). The first device may monitor the wireless channel using energy detection of the channel (e.g., sensing the medium for idle or busy, or measuring a value of received signal strength indication (RSSI) or signal-to-noise ratio (SNR) of wireless signals transmitted on the medium) or inspection of a management frame (e.g., beacon frame). In some implementations, the processor of the first device may monitor, via the wireless communication interface, a combined level of usage of the wireless channel by the first device and the other devices (e.g., a total utilization or occupancy of the channel by AP1, AP2, AP3, AP4 in FIG. 4). For example, the first device can monitor a total utilization or occupancy of the channel by sniffing frames transmitted by other devices, or sensing the channel to detect the period in which the channel is busy, or inspecting beacon frames transmitted from APs on the channel.

In a process 704, the processor may determine information about other devices using the wireless channel. In some implementations, in determining the information about the other devices, the processor may use at least one of (1) determine a number of the other devices and the first device using the wireless channel, (2) determine a number of beacons transmitted in the wireless channel, (3) determine a number of distinct media access control (MAC) addresses of the other devices and the first device that are using the wireless channel, or (4) determine a number of distinct traffic classes over the other devices and the first device that are using the wireless channel. For example, the first device can determine (1) a number of the other devices and the first device and (3) a number of distinct media access control (MAC) addresses of the other devices and the first device that are using the wireless channel, by sniffing frames transmitted by other devices and detecting distinct source (transmitting) MAC addresses and distinct destination (receiving) MAC addresses, contained in the frames. The first device can (2) determine a number of beacons (or a number of APs transmitting the beacons) transmitted in the wireless channel by inspecting beacon frames transmitted from APs on the channel.

In a process 706, the processor of the first device may determine a target share of the wireless channel for use by the first device in communicating data for the artificial reality, according to the information about the other devices using the wireless channel. In some implementations, the first device may determine the target share based on (1) current bit rate of artificial reality applications of the first device, (2) frame rate of artificial reality applications of the first device, or (3) a smaller airtime of a fair share airtime and an airtime an application of the first device actually needs. In some implementations, this fairness scheme is implemented at the device level instead of the application level because otherwise, a device can open multiple applications and artificially or intentionally increase its fair share of the medium. In some implementations, the fair share airtime may be a 1/n fair share (when there exist n applications/devices in total). For example, if there exist four applications/devices using the medium in total, the first device may determine the target share to be 25% of a beacon period. In some implementations, in determining the target share, the processor may determine a range for the target share according to the information about the other devices, and determine the target share in the range. For example, if (1) there exist four applications/devices using the medium in total and (2) each application of the first device actually needs at least 10% share of a beacon period, the first device may determine the target share in the range between 10% and 25% of the beacon period.

In a process 708, the processor of the first device may access, via the wireless communication interface, the wireless channel according to (1) the target share of the wireless channel (e.g., a 1/n fair share when there exist n applications/devices in total) and (2) a combined level of usage of the wireless channel by the first device and the other devices (e.g., a total utilization or occupancy of the channel by AP1, AP2, AP3, AP4 in FIG. 4). For example, it is assumed that the utilization threshold is 70% of a beacon period, the target share (as determined by the first device) is 25% of the beacon period, and the target share in the range (as determined by the first device) is between 10% and 25% of the beacon period.

In some implementations, the processor of the first device may compare the combined level of usage (e.g., a total utilization or occupancy of the channel by AP1, AP2, AP3, AP4 in FIG. 4 during a beacon period) with a utilization threshold (e.g., 70% of the beacon period). In some implementations, in accessing the wireless channel, the processor may determine that the combined level of usage is within the utilization threshold when a level of usage of the first device is near or at the target share, and access the wireless channel beyond the target share responsive to the determining that the combined level of usage is within the utilization threshold when the level of usage of the first device is near or at the target share. For example, if the combined level of usage of the wireless channel by the first device and the other devices (as determined by the first device) is 50%, because the combined level of usage is within the utilization threshold (70%), the first device may access the wireless channel beyond the target share (e.g., 35%).

On the other hand, in accessing the wireless channel, the processor may determine that the combined level of usage (e.g., a total utilization or occupancy of the channel by AP1, AP2, AP3, AP4 in FIG. 4 during a beacon period) is near or approaching the utilization threshold (e.g., 70% of the beacon period), and responsive to the determining that the combined level of usage is near or approaching the utilization threshold, reduce the first device's access to wireless channel from the target share to a new target share that is greater than or equal to a minimum value of the range. For example, if the combined level of usage of the wireless channel (as determined by the first device) is 65%, because the combined level of usage is near or approaching the utilization threshold (70%), the first device may reduce the first device's access to wireless channel from the target share (25%) to a new target share (e.g., 15%) that is greater than or equal to a minimum value of the range (e.g., 10%).

In some implementations, in accessing the wireless channel, the processor of the first device may access the target share of the wireless channel according to one or more time slots. The other devices may access the wireless channel using their respective time slots. In some implementations, in accessing the target share of the wireless channel, the processor may be configured to determine that a second device of the other devices is not using a time slot allocated to the second device, and access the wireless channel using the time slot allocated to the second device, responsive to determining that the second device is not using the time slot allocated to the second device. For example, wireless links on the shared medium (e.g., USER/BSS #1, USER/BSS #2, USER/BSS #3, USER/BSS #4 in FIG. 4 and FIGS. 5A and 5B) may access the target share of 25% of the beacon period in their respective slots (see FIG. 5A), however, if one wireless link does not use its allocated slot, other wireless links can contend for that slot after a fixed amount of time has passed, using standard Wi-Fi contention parameters (e.g., DCF inter-frame spacing (DIFS) or arbitration inter-frame spacing (AIFS)), thereby preventing wastage of slot airtime allocated by such devices.

In some implementations, in accessing the wireless channel, the processor of the first device may determine that data is available from the first device for communication via the wireless channel (e.g., the USER/BSS #1 determines that data is available from upper layers of a rendering pipeline at time $T_{12}$ in FIG. 6). The first device may then access, within a defined time from the data being available (e.g., within a time less than DIFS or AIFS from the time when data is available from the upper layers), the wireless channel according to (1) a target share (e.g., a ⅓ fair share of the beacon period 650 because there are only three wireless links or BSSs using the medium), and (2) a combined level of usage of the wireless channel (e.g., 60% of the beacon period). In some implementations, in accessing the wireless channel, the processor may be configured to restrict or duty-cycle the first device's usage of the wireless channel according to the determined target share. For example, as shown in FIG. 6, the wireless transfer of USER/BSS #1 at time $T_{11}$ may be restricted or duty-cycled to the determined target share DC 660 so that the USER/BSS #1 can transmit only a portion of the whole data (wireless transfer #1-1 denoted by 611).

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method, comprising:
   monitoring, by a first device configured to execute an application for artificial reality, a wireless channel;
   determining, by the first device responsive to the monitoring, information about other devices using the wireless channel;
   determining, by the first device, a target share of the wireless channel for use by the first device in communicating data for the artificial reality, according to the information about the other devices using the wireless channel; and
   accessing, by the first device, the wireless channel according to (1) the target share of the wireless channel and (2) a combined level of usage of the wireless channel by the first device and the other devices.

2. The method according to claim 1, further comprising:
   monitoring, by the first device, the combined level of usage of the wireless channel by the first device and the other devices; and
   comparing, by the first device, the combined level of usage with a utilization threshold.

3. The method according to claim 2, wherein accessing the wireless channel comprises:
   determining, by the first device, that the combined level of usage is within the utilization threshold when a level of usage of the first device is within a particular range of the target share; and
   accessing, by the first device, the wireless channel beyond the target share responsive to the determining that the combined level of usage is within the utilization threshold when the level of usage of the first device is within the particular range of the target share.

4. The method according to claim 2, wherein determining the target share comprises:
   determining a range for the target share according to the information about the other devices; and
   determining the target share in the range, and accessing the wireless channel comprises:
   determining, by the first device, that the combined level of usage is within a particular range of the utilization threshold; and
   responsive to the determining that the combined level of usage is within the particular range of the utilization threshold, reducing, by the first device, the first device's access to wireless channel from the target share to a new target share that is greater than or equal to a minimum value of the range.

5. The method according to claim 1, wherein monitoring the wireless channel comprises:
   monitoring the wireless channel using at least one of energy detection, inspection of a management frame, or sniffing wireless frames.

6. The method according to claim 1, wherein determining the information about the other devices comprises at least one of:
   determining a number of the other devices and the first device using the wireless channel,
   determining a number of beacons transmitted in the wireless channel,
   determining a number of distinct media access control (MAC) addresses of the other devices and the first device that are using the wireless channel, or
   determining a number of distinct traffic classes over the other devices and the first device that are using the wireless channel.

7. The method according to claim 1, wherein accessing the wireless channel comprises:
   determining that data is available from the first device for communication via the wireless channel; and
   accessing, by the first device within a defined time from the data being available, the wireless channel according to the target share and the combined level of usage of the wireless channel.

8. The method according to claim 1, wherein accessing the wireless channel comprises:
   accessing the target share of the wireless channel according to one or more time slots,
   wherein the other devices access the wireless channel using their respective time slots.

9. The method according to claim 1, wherein accessing the target share of the wireless channel comprises:
   determining, by the first device, that a second device of the other devices is not using a time slot allocated to the second device; and
   accessing, by the first device, the wireless channel using the time slot allocated to the second device, responsive to determining that the second device is not using the time slot allocated to the second device.

10. The method according to claim 1, wherein accessing the wireless channel comprises:
    restricting, by the first device, the first device's usage of the wireless channel according to the determined target share.

11. A system as a first device configured to execute an application for artificial reality, comprising:
    a wireless communication interface; and
    a processor configured to:
       monitor, via the wireless communication interface, a wireless channel;
       determine information about other devices using the wireless channel;
       determine a target share of the wireless channel for use by the first device in communicating data for the artificial reality, according to the information about the other devices using the wireless channel; and
       access, via the wireless communication interface, the wireless channel according to (1) the target share of the wireless channel and (2) a combined level of usage of the wireless channel by the first device and the other devices.

12. The system according to claim 11, wherein the processor is configured to:
    monitor, via the wireless communication interface, the combined level of usage of the wireless channel by the first device and the other devices; and
    compare the combined level of usage with a utilization threshold.

13. The system according to claim 12, wherein in accessing the wireless channel, the processor is configured to:
    determine that the combined level of usage is within the utilization threshold when a level of usage of the first device is within a particular range of the target share; and
    access the wireless channel beyond the target share responsive to the determining that the combined level of usage is within the utilization threshold when the level of usage of the first device is within the particular range of the target share.

14. The system according to claim 12, wherein
    in determining the target share, the processor is configured to:
       determine a range for the target share according to the information about the other devices; and
       determine the target share in the range, and
    in accessing the wireless channel, the processor is configured to:
       determine that the combined level of usage is within a particular range of the utilization threshold; and
       responsive to the determining that the combined level of usage is within the particular range of the utilization threshold, reduce the first device's access to wireless channel from the target share to a new target share that is greater than or equal to a minimum value of the range.

15. The system according to claim 11, wherein in monitoring the wireless channel, the processor is configured to:
    monitor the wireless channel using at least one of energy detection, inspection of a management frame, or sniffing wireless frames.

16. The system according to claim 11, wherein in determining the information about the other devices, the processor is configured to at least one of:
    determine a number of the other devices and the first device using the wireless channel,
    determine a number of beacons transmitted in the wireless channel,
    determine a number of distinct media access control (MAC) addresses of the other devices and the first device that are using the wireless channel, or
    determine a number of distinct traffic classes over the other devices and the first device that are using the wireless channel.

17. The system according to claim 11, wherein in accessing the wireless channel, the processor is configured to:
    determine that data is available from the first device for communication via the wireless channel; and
    access, within a defined time from the data being available, the wireless channel according to the target share and the combined level of usage of the wireless channel.

18. The system according to claim 11, wherein in accessing the wireless channel, the processor is configured to:
    access the target share of the wireless channel according to one or more time slots,
    wherein the other devices access the wireless channel using their respective time slots.

19. The system according to claim 11, wherein in accessing the target share of the wireless channel, the processor is configured to:
    determine that a second device of the other devices is not using a time slot allocated to the second device; and
    access the wireless channel using the time slot allocated to the second device, responsive to determining that the second device is not using the time slot allocated to the second device.

20. The system according to claim 11, wherein in accessing the wireless channel, the processor is configured to:
  restrict the first device's usage of the wireless channel according to the determined target share.

* * * * *